United States Patent [19]

Jones

[11] Patent Number: 5,733,192
[45] Date of Patent: Mar. 31, 1998

[54] BEATER BAR ASSEMBLY FOR THRESHING MACHINE

[76] Inventor: Douglas R. Jones, 2300 E. 3515 North Rte. 2, Filer, Id. 83328

[21] Appl. No.: 621,591

[22] Filed: Mar. 26, 1996

[51] Int. Cl.⁶ ............................................. A01F 12/10
[52] U.S. Cl. ..................... 460/113; 460/20; 460/73; 460/106
[58] Field of Search ....................... 460/113, 16, 20, 460/70, 73, 105, 106

[56] References Cited

U.S. PATENT DOCUMENTS

| | | | |
|---|---|---|---|
| 5,186,683 | 2/1993 | Farley et al. | 460/105 |
| 5,273,488 | 12/1993 | Hollevoet | 460/106 |
| 5,368,522 | 11/1994 | Ricketts et al. | 460/105 X |

*Primary Examiner*—Terry Lee Melius
*Attorney, Agent, or Firm*—Frank J. Dykas

[57] ABSTRACT

A beater bar assembly for use in a threshing machine. The beater bar assembly is formed of a chute assembly and interfitting, horizontally oriented, rotating cylindrical drum having a plurality of extending teeth forming racks of combs. The chute assembly contains a collection sump which serves as a rock trap. The rotating drum teeth comb through the incoming plant material, batting entrained rocks and other debris into the collection sump, and accelerating the remaining plant material through the chute and into the threshing assembly of the machine.

7 Claims, 4 Drawing Sheets

BEATER BAR ASSEMBLY FOR THRESHING MACHINE

BACKGROUND OF THE INVENTION

1. Technical Field

This invention generally relates to a beater bar assembly used to accelerate plant material into a combine threshing feed auger, and more particularly to a beater bar assembly which combs the plant material to remove entrained rock and other foreign material from the plant material.

2. Background

Mobile threshing machines commonly include plant material cutter heads and scythes for cutting the plant material and transporting it, in an elevator, up into the threshing device. These machines are commonly referred to as combines. A typical prior art combine is shown in prior art FIG. 1.

As shown in prior art FIG. 1, the combine includes a rotating cutter head or scythe which cuts off the tops of the plants containing the grains, for example wheat, and drops them into the grain header from where they are taken by the elevator up to the rotor intake auger for delivery to the threshing assembly.

There are a variety of different threshing assembly designs in common use today, most of which use a rotating drum and some sort of impaction devices to separate the husks, pods, and chafe from the grains, beans or seeds which are being harvested. The particular design for the threshing machine assembly plays no part in the present invention except for the fact that in virtually all of them, ingested rocks which are delivered into the threshing assembly can and often do substantial damage to the threshing mechanisms. These rocks also contaminate the harvested crop.

As a result, some of the newer and better combine designs include some sort of a combination of a beater bar and a rock trap. The rock trap is generally a collection sump located at the discharge end of the elevator. Cut plant material and any entrained rocks, pieces of wood or other foreign objects travel up the elevator between a draper chain or a belt and the bottom of the elevator shroud, to the end of the elevator where it is dumped off. It is the intention that the rocks will drop out of the flow of material into the rock trap where they are collected until the operator can open some sort of a trap door device to drop the rocks safely at the edge of the field. The remaining cut plant material is beaten by a bar, and simultaneously accelerated and carried up and around a slide chute into the rotor intake auger.

There are problems with this prior art design. First, the beater bar is typically a horizontally oriented, rectangular box structure 8" to 12" in width by three and one-half to five feet in length. Extending out diagonally from the corners of the box structure are solid bar-like paddles which extend out to two to four inches from the box. This design is intended to enable the bar to impact the incoming plant material to bat down into a collection sump any entrained rocks, wood, or other foreign articles. The problem is that it does not consistently achieve this result. All too frequently the beater bar will carry the rock, entrained within the plant material, around the slide chute and up into the rotor intake auger, where it can cause great harm to the threshing assembly. The solid paddles also damage some of the incoming grains.

Another problem with the prior art design is that the beater bars tend to collect batches of the incoming plant material from the elevator, and instead of beginning the threshing process by first impacting the incoming seed pods, clumps the incoming material together. If the material contains entrained weed or vine material, it will plug the collection sump area, and even the rotor intake auger to the extent that the machine must be stopped and cleaned out. Finally, if the entrained material is weedy, and contains significant amounts of weed and vine plant material and entrained rocks, the entrained rocks can become jammed between the beater bars and the slide chute.

In weeded fields, particularly with grains and beans, it is not uncommon for the beater bar assembly to plug up several times per day. This results in the operator having to stop the combining and threshing operations and attempt to operate the combine threshing assembly and the beater bar and elevator in a reverse direction in an attempt to clear the plug, and if that is not successful, to shut the machine down and manually clear the plugged material and jammed rocks using hand tools. Indeed, automatic reversing operation is sometimes advertised as a design feature of prior art combines.

Accordingly, what is needed is a combination beater bar and rock trap assembly which is provided with combing teeth, as opposed to beating bars. What is needed is combing teeth which will comb through the incoming plant material to bat away entrained rocks, without clumping the plant material together for acceleration on the slide chute and batch feeding into the rotor intake auger. It is another object of this invention to provide a beater bar that will accelerate a combed and more uniform flow of plant material into the rotor intake auger for a smoother and more efficient operation of the threshing assembly. Another object of the present invention is to provide comb teeth for impacting with the plant material as it is being delivered to the rotor intake auger.

Another object of the present invention is to improve the efficiency of operation and to reduce the incidence of plugging. Yet another object is to reduce crop damage to threshed plant material through reduction of the significant impacts which occur with the beater bar assembly against the plant material.

DISCLOSURE OF INVENTION

These objects are achieve in a new beater bar assembly formed of a delivery chute and a horizontally oriented cylindrical drum having a plurality of teeth forming combs for combing through the material to bat away rocks and other debris and to feed the remaining plant material into the rotor intake auger of the threshing assembly.

The delivery chute is formed of four different sections. The first is the receiving section which is configured to operatively, but not necessarily rigidly, interconnect the elevator assembly of the combine to the beater bar assembly so that conveyed plant material and debris will drop into the delivery chute. The next section, which is attached to the rear of the delivery section, is a collection sump which serves as a rock trap into which rocks, wood and other debris will be batted by impaction with the teeth extending out from the rotating cylindrical drum. The bottom of the collection sump contains a trap door for releasing collected rocks. The next section of the delivery chute is a concave delivery section which is designed to provide a sliding surface between the teeth extending out from the cylindrical drum and the delivery chute where combed plant material, minus rocks and other debris, is collected, accelerated and conveyed into the fourth section, called the delivery section, and ultimately into the rotor intake auger of the threshing assembly.

The beater drum is cylindrical in shape, horizontally oriented, and has fixed internal tooth brackets which are adapted for receiving and holding a plurality of teeth in comb like racks. The teeth extend out from the surface of the cylindrical drum at an obtuse angle away from the direction of rotation of the drum.

In operation, the cut plant material, entrained weeds, rocks and other debris are elevated into the delivery chute by means of an elevator. As the mixture of material drops into the receiving section it comes in contact with the teeth extending out from the rotating cylindrical drum. The teeth comb through the material, batting out rocks and other debris, and combing out the remaining plant material as it accelerates it and delivers it, over the delivery section of the chute, into the rotor intake auger of the threshing auger.

BEST MODE FOR CARRYING OUT INVENTION

Figure 1:
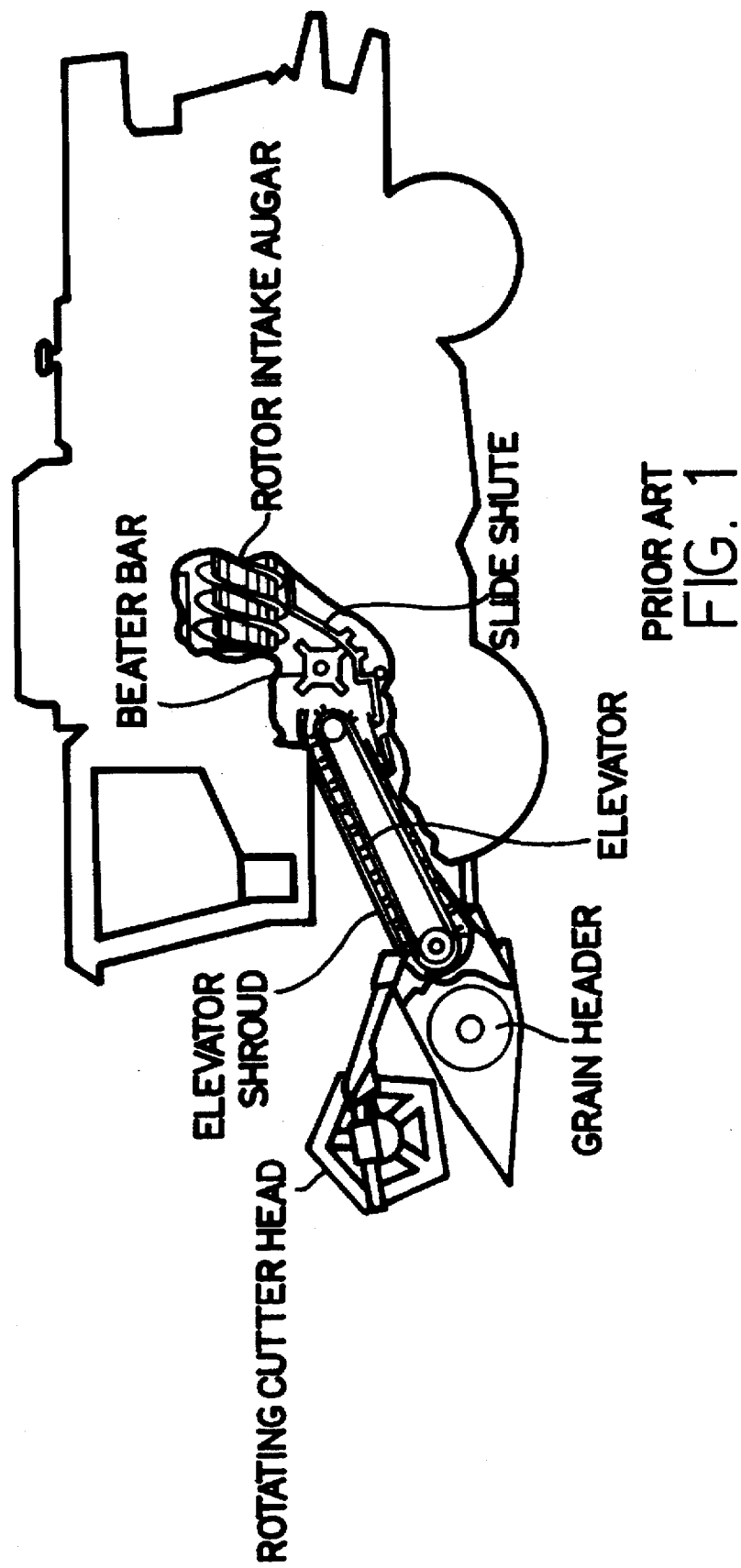
FIG. 1 is a sectional representational side view of a prior art harvester showing the cutter head, grain header, elevator, beater bar and rotor intake auger in representational format.
Figure 2:
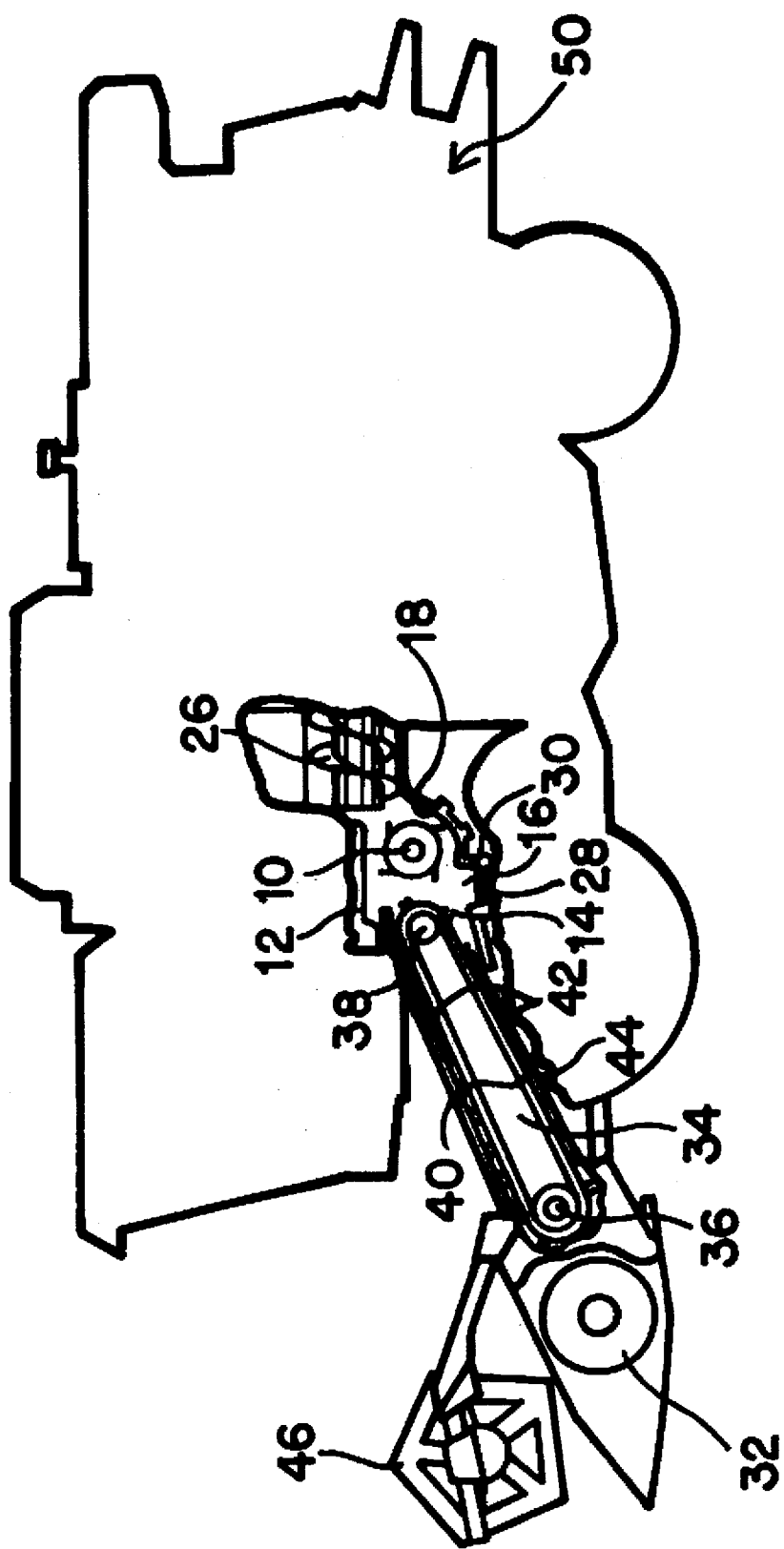
FIG. 2 is a sectional representational side view of a combined threshing machine showing the rotating cutter head, grain header, elevator, new beater bar and intake rotor auger.
Figure 3:
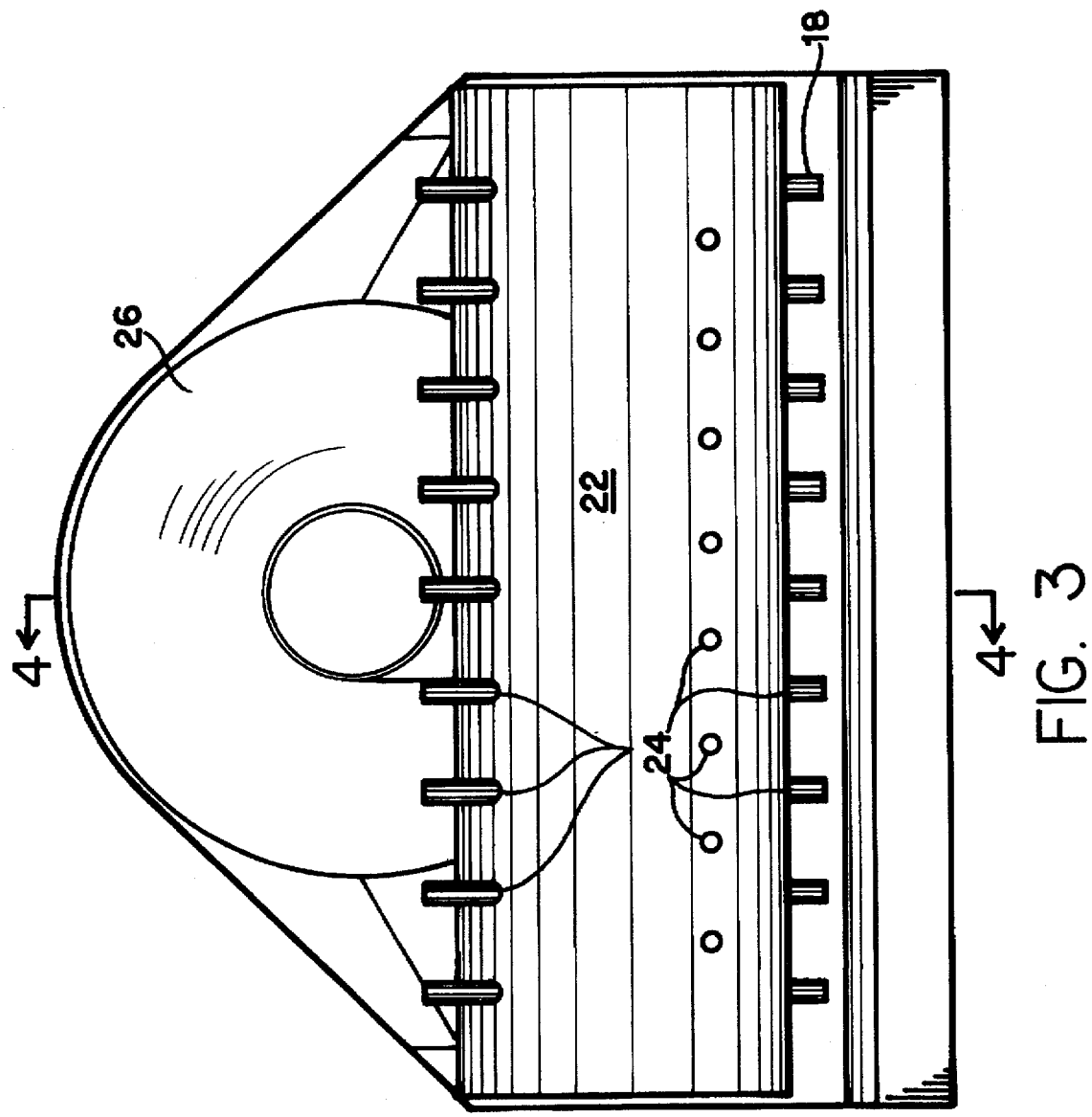
FIG. 3 is a front plan view of the new beater bar assembly.
Figure 4:
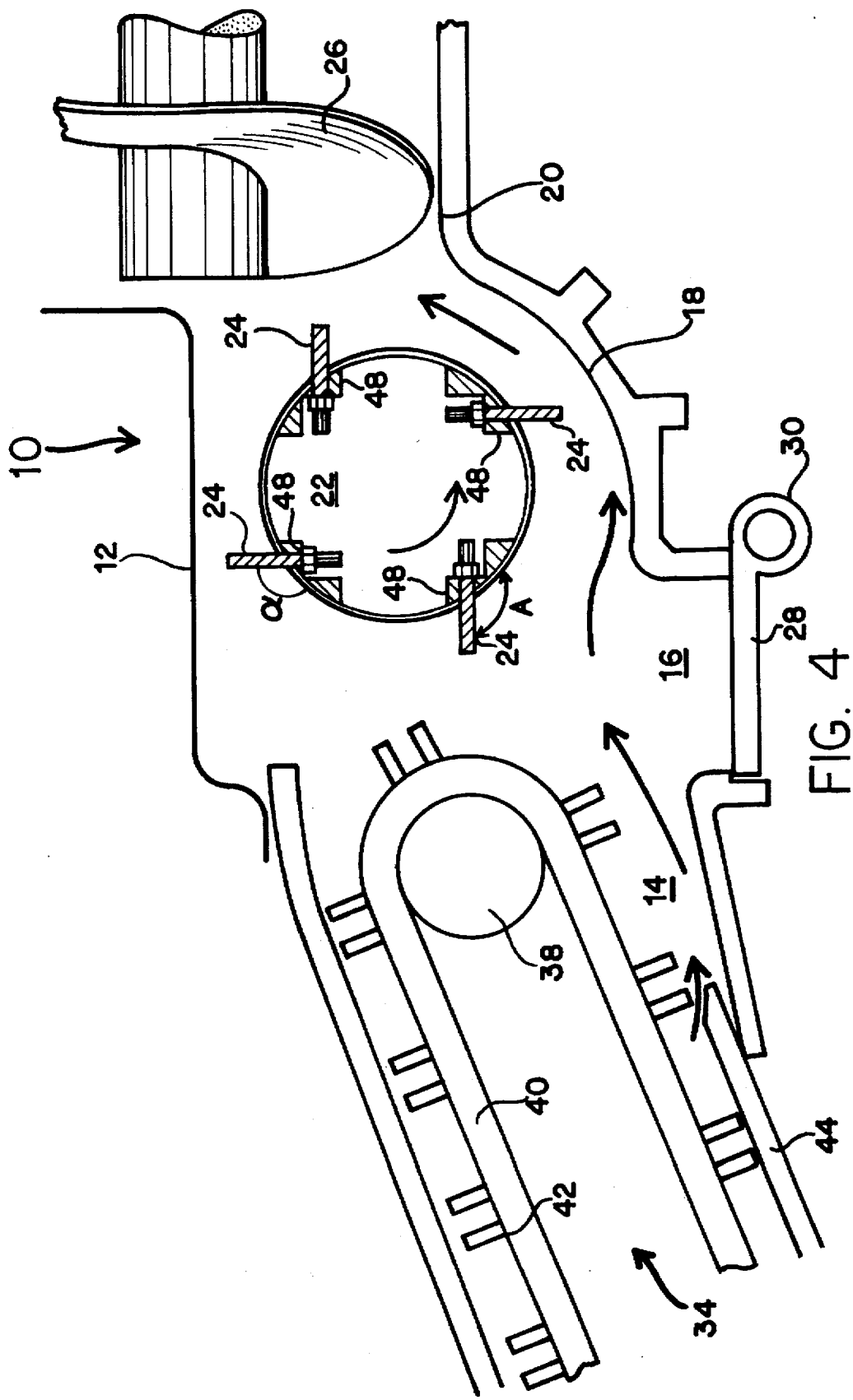
FIG. 4 is a sectional side view of the new beater bar assembly.

Referring to FIGS. 2, 3 and 4, my new beater bar assembly 10 is shown to advantage, installed within combine thresher 50. As can be seen in FIG. 2, rotating cutter head 46 is held, by well-known linkages and power drive systems, in an elevated cutting position intended to cut off the top portions of the crop and drop them into grain header 32, where they are collected and delivered to elevator assembly 34. Elevator assembly 34 is formed of elevator draper chain 40 formed in a continuous loop around lower chain sprocket assembly 36 and upper chain sprocket assembly 38. Sprockets 36 and 38 turn in a counter clockwise direction, and convey the cut plant material under the draper chain 40 between draper chain lugs 42 and lower shroud 44. Any entrained rocks, wood, weeds or vines will also, unfortunately, be conveyed by elevator assembly 34 up into beater assembly 10.

Beater assembly 10 is formed of a delivery chute 12 which itself is formed of four different sections. The first frontal section is receiving section 14, which is designed and/or configured to operatively, but not necessarily rigidly and mechanically, interconnect with elevator assembly 34 so as that conveyed plant material and debris will drop into delivery chute 12 for processing.

The next section, which is attached at its front to the rear of delivery section 14, is collection sump 16 which is designed as a rock trap into which rocks will drop by gravity and/or will be batted into by means of impaction with teeth 24 as they comb through the plant material. The bottom of collection sump 16 is configured as trap door 28 held by conventional hinge assembly 30 in the preferred embodiment. However, a number of other embodiments can be devised which will work equally as well, including manually openable trap doors, collection chutes, side opening doors, and the like.

The next section of delivery chute 12 is the concave cylindrical section 18, which is designed to provide a sliding surface between beater drum 22, teeth 24, and delivery chute 12. It is here that combed plant material, minus rocks and other debris, is collected, accelerated and conveyed into discharge section 20 of delivery chute 12 and ultimately into the rotor intake auger 26 from where it is conveyed into the threshing assembly.

Beater drum 22, in the preferred embodiment, is cylindrical in shape, horizontally oriented, and has fixed internal tooth brackets 48 which are adapted for receiving threaded teeth 24 which are held in place within the bracket by means of conventional threaded bolts. In this manner, by the use of tooth brackets 48, it is possible to design the positioning for teeth 24, such that the angle of inclination can be predetermined for a particular application. For example, teeth brackets 48 can be configured to position teeth 24 normal to the tangential plane of beater drum 22, or, as is shown in the preferred embodiment, as an obtuse angle A away from the direction of rotation as shown by the arrow drawn within beater drum 22 as shown in FIG. 4.

In the preferred embodiment, as is shown in FIG. 4, teeth 24 extend at an obtuse angle A away from the direction of rotation. It has been found that when combining and threshing podded beans and soft white wheat, angling teeth 24 at the obtuse angle A results in less damage to the threshed crop. However, in other applications it may be preferred to extend teeth 24 normally out, or even at an acute angle to the direction of rotation.

Also, as shown in FIG. 3, in the preferred embodiment teeth 24 are arranged in comb-like rows, preferably with an alternating number of teeth per row so as to present a plurality of combs to the incoming plant material and entrained debris. However, it should be noted that it is not necessary, but merely preferred, to arrange teeth 24 in rows, since staggered arrangement for teeth 24 will also work satisfactorily.

In operation, the cut plant material, entrained weeds, rocks and other debris are elevated into delivery chute 12 of beater assembly 10 by means of elevator 34. As this mixture of material drops into the receiving section 14, it comes in contact with teeth 24, which partially comb through the material as they collect and accelerate it into concave cylindrical section 18. The combing action results in a batting out of rocks and other debris into collection sump 16. If the plant material contains entrained weeds and vine material, it also results in a combing out of this material so as to prevent clumps of it from being passed through to rotor intake auger 26. In field trials, a number of significant advantages result from the use of new beater assembly 10. In the operation of two identical combines, one with a conventional prior art beater bar, and the second with new beater assembly 10 as shown and described herein, it was found that there was a 10% to 15% increase in combine production, a 10% to 15% reduction in threshed crop damage, and a drastic reduction in the number of plug-ups requiring reverse operation of the combine machinery to clear plugs. In practice, during one testing season, in essentially the same fields and conditions, the prior art beater bar assembly plugged approximately one hundred times, as opposed to three times for the combine utilizing beater assembly 10.

While there is shown and described the present preferred embodiment of the invention, it is to be distinctly understood that this invention is not limited thereto but may be variously embodied to practice within the scope of the following claims.

I claim:

1. A beater assembly, for use in a threshing machine having a feed assembly for delivering plant material to be threshed to said threshing machine and a threshing assembly for threshing plant material, said beater assembly comprising:

- a delivery chute interposed between the feed assembly and the threshing assembly, said delivery chute having an intake section having first and second ends, operatively connected at its first end to the feed assembly for receiving plant material from the end feed assembly and connected at its second end to a collection sump, said collection sump having first and second ends with the first end connected to the second end of said intake section and its second end connected to a concave cylindrical section, said concave cylindrical section having a horizontally oriented longitudinal axis anf first and second ends, said concave cylindrical section being connected at its first end to the second end of said collection sump and at its second end to a discharge section, and said discharge section having first and second ends with the first end connected to the second end of the concave cylindrical section and the second end operatively connected to the threshing assembly for delivering plant material to the threshing assembly;
- a cylindrical beater drum, rotatably mounted in a generally horizontal orientation within the horizontally oriented concave cylindrical section of the delivery chute, for rotaton in a downwardly direction adjacent to the collection sump of said chute, and in a generally upwardly direction adjacent to the discharge section of said delivery chute;
- a plurality of teeth attached to and extending out from the surface of said cylindrical drum for combing through the plant material; and means for rotating the cylindrical drum.

2. The beater assembly of claim 1 wherein the plurality of teeth each extend out from the surface of the cylindrical drum at an obtuse angle away from the direction of rotation of the cylindrical drum and within planes perpendicular to the longitudinal axis of said cylindrical drum.

3. The beater assembly of claim 1 wherein the plurality of teeth each extend out from the surface of the cylindrical drum in a plurality of elementally arranged rows.

4. The beater assembly of claim 3 wherein the plurality of teeth each extend out from the surface of the cylindrical drum at an obtuse angle away from the direction of rotation of the cylindrical drum and within planes perpendicular to the longitudinal axis of said cylindrical drum.

5. The beater assembly of claim 1 wherein the collection sump further includes means for selectively dumping the contents of said collection sump.

6. A beater assembly, for use in a threshing machine having a feed assembly for delivering plant material to be threshed to said threshing machine and a threshing assembly for threshing plant material, said beater assembly comprising:

- a delivery chute interposed between the feed assembly and the threshing assembly, said delivery chute having an intake section having first and second ends, operatively connected at its first end to the feed assembly for receiving plant material from the feed assembly and connected at its second end to a collection sump, said collection sump having first and second ends with the first end connected to the second end of said intake section and its second end connected to said concave cylindrical section, said collection sump further including means for selectively dumping the contents of said collection sump, a concave cylindrical section having a horizontally oriented longitudinal axis and first and second ends, said concave cylindrical section being connected at its first end to the second end of said collection sump and at its second end to a discharge section, said discharge section having first and second ends with the first end connected to the second end of said concave cylindrical section and the second end operatively connected to the threshing assembly for delivering plant material to the threshing assembly;
- a cylindrical beater drum, rotatably mounted in a generally horizontal orientation within the horizontally oriented concave cylindrical section of the delivery chute, for rotation in a downwardly direction adjacent to the collection sump of said chute, and in a generally upwardly direction adjacent to the discharge section of said delivery chute;
- a plurality of teeth attached to and extending out from the surface of said cylindrical drum at an obtuse angle away from the direction of rotation of the cylindrical drum and within planes perpendicular to the longitudinal axis of said cylindrical drum for combing through the plant material; and
- means for rotating the cylindrical drum.

7. A beater assembly, for use in a threshing machine having a feed assembly for delivering plant material to be threshed to said threshing machine and a threshing assembly for threshing plant material, said beater assembly comprising:

- a delivery chute interposed between the feed assembly and the threshing assembly, said delivery chute having an intake section having first and second ends, operatively connected at its first end to the feed assembly for receiving plant material from the feed assembly and connected at its second end to a collection sump, said collection sump having first and second ends with the first end connected to the second end of said intake section and its second end connected to a concave cylindrical section, said concave cylindrical section having a horizontally oriented longitudinal axis and first and second ends, said concave cylindrical section being connected at its first end to the second end of said collection sump and at its second end to a discharge section, and said discharge section having first and second ends with the first end connected to the second end of the concave cylindrical section and the second end operatively connected to the threshing assembly for delivering plant material to the threshing assembly;
- a beater rotatably mounted in a generally horizontal orientation within the horizontally oriented concave cylindrical section of the delivery chute, for rotation in a downwardly direction adjacent to the collection sump of said chute, and in a generally upwardly direction adjacent to the discharge section of said delivery chute;
- a plurality of teeth attached to and extending out from said beater for combing through the plant material; and means for rotating the beater.

* * * * *